Nov. 30, 1937.   D. C. PRINCE   2,100,748
POWER TRANSMISSION
Filed May 18, 1935   5 Sheets-Sheet 1
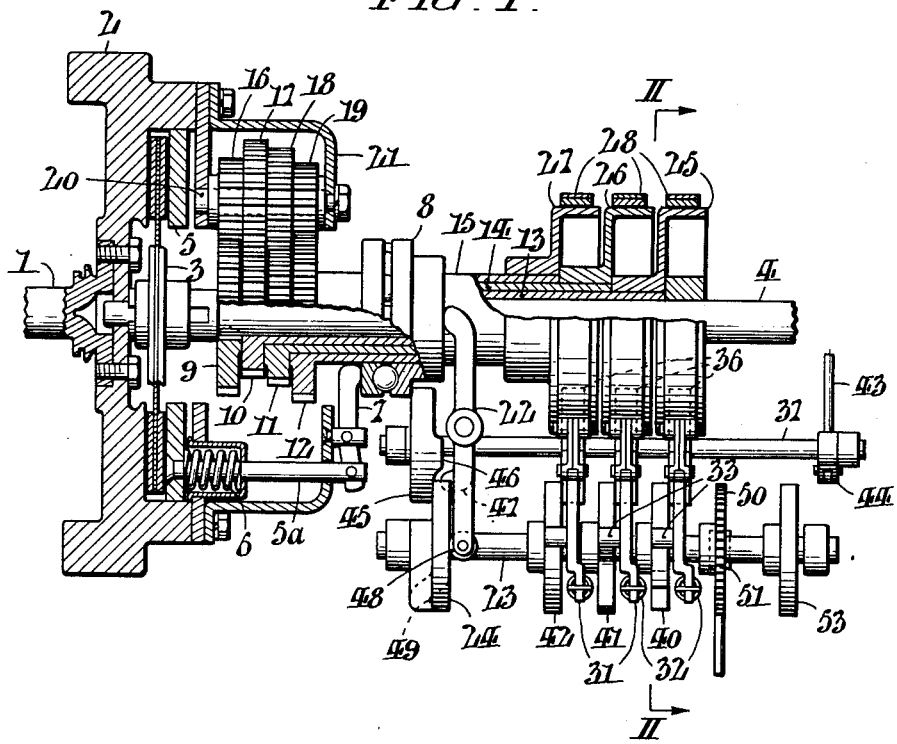
FIG. I.
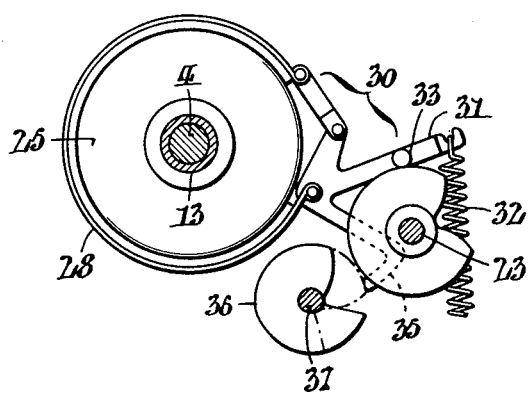
FIG. II.
WITNESSES:
John A. Weidler
William Bell, Jr.
INVENTOR:
David C. Prince,
BY Frally Paul
ATTORNEYS.

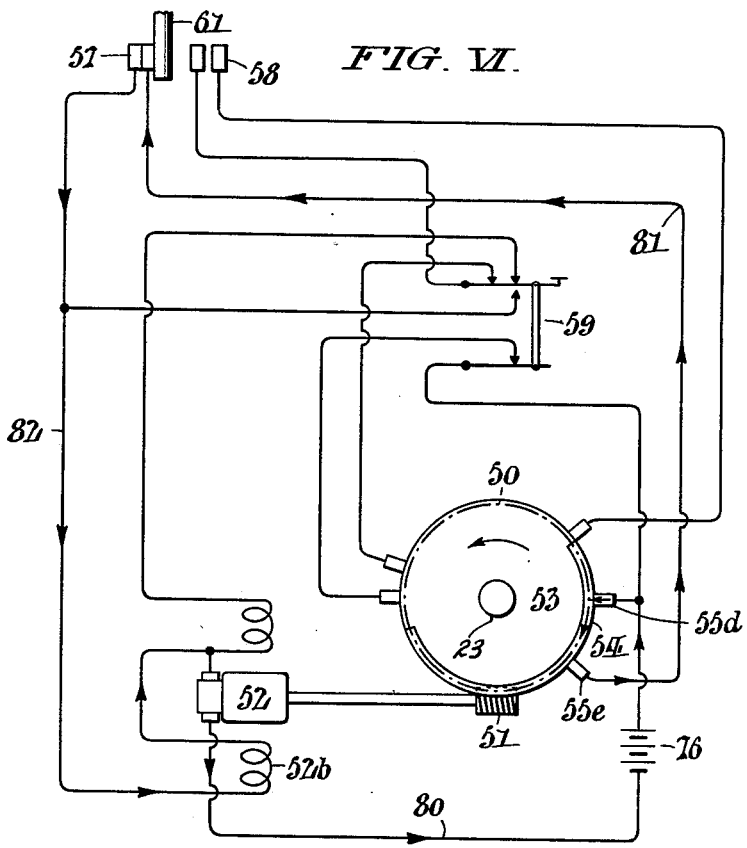
FIG. VI.
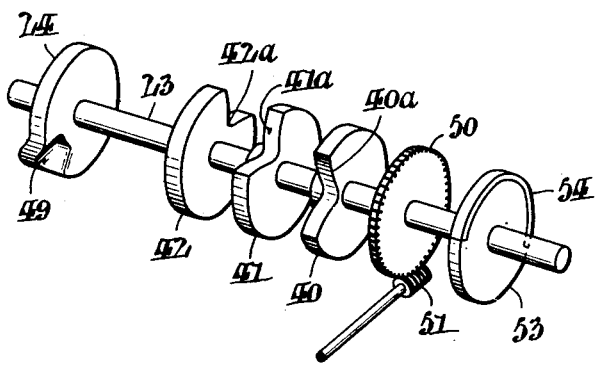
FIG. III.

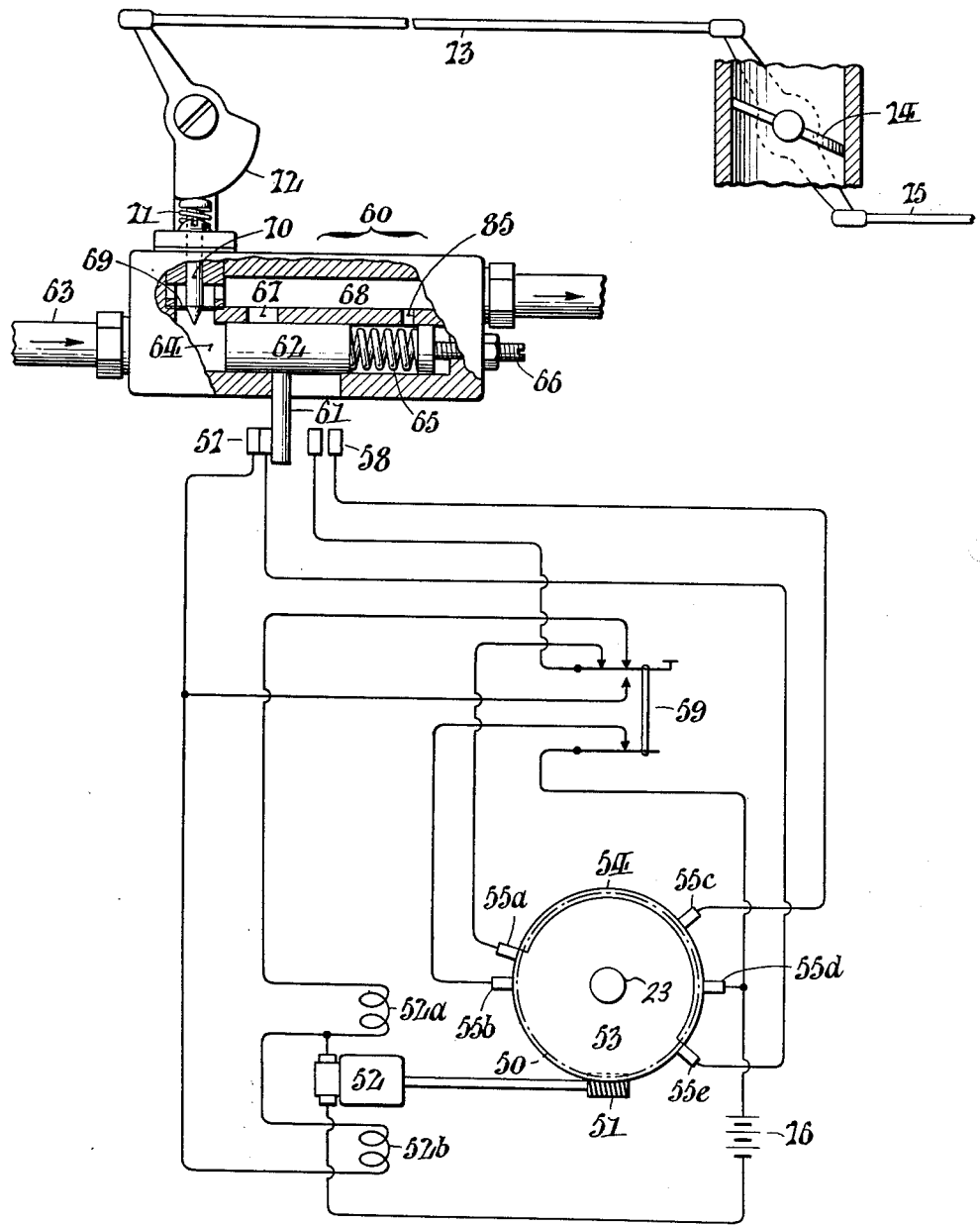

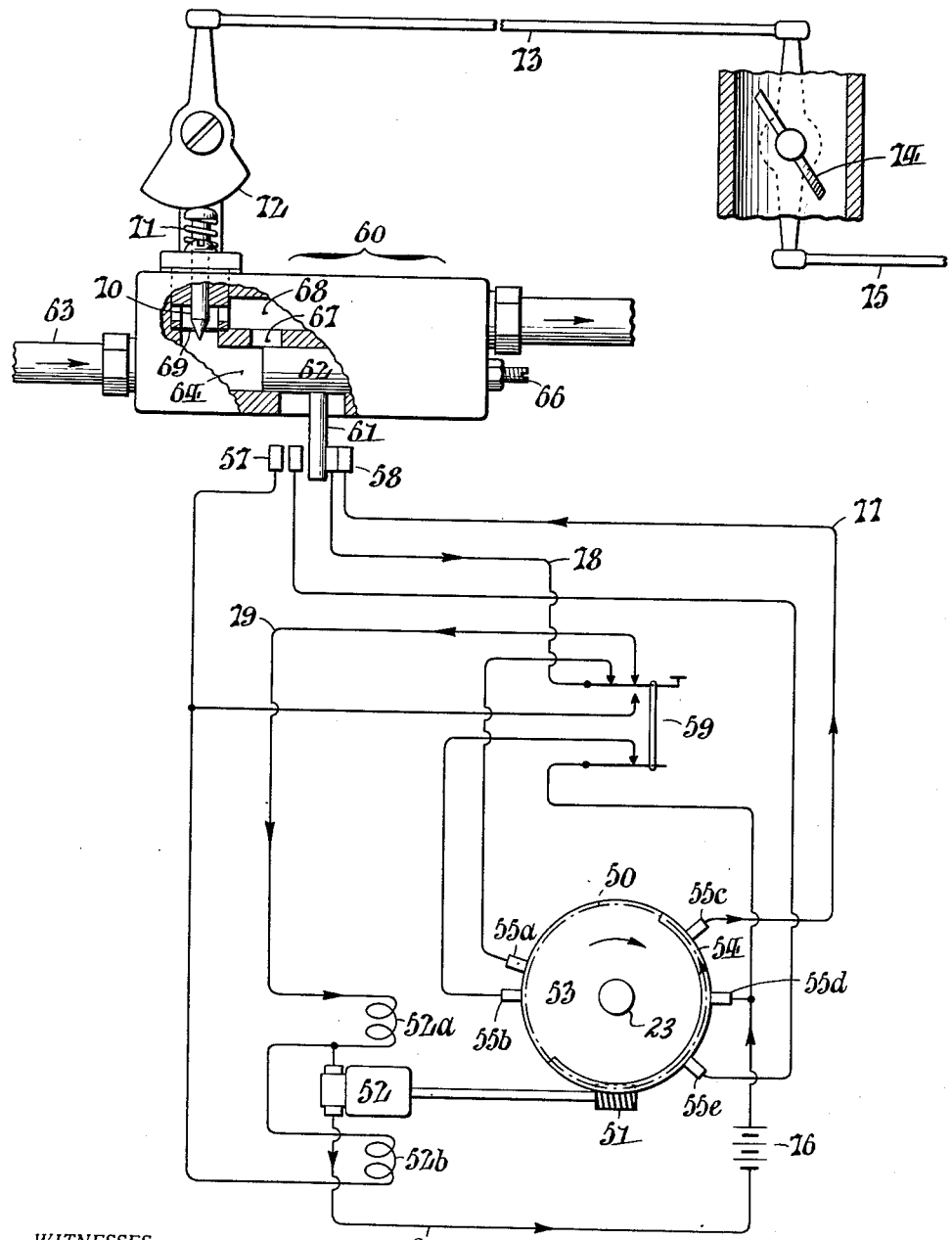
Nov. 30, 1937.     D. C. PRINCE     2,100,748
POWER TRANSMISSION
Filed May 18, 1935     5 Sheets-Sheet 4
FIG. V.

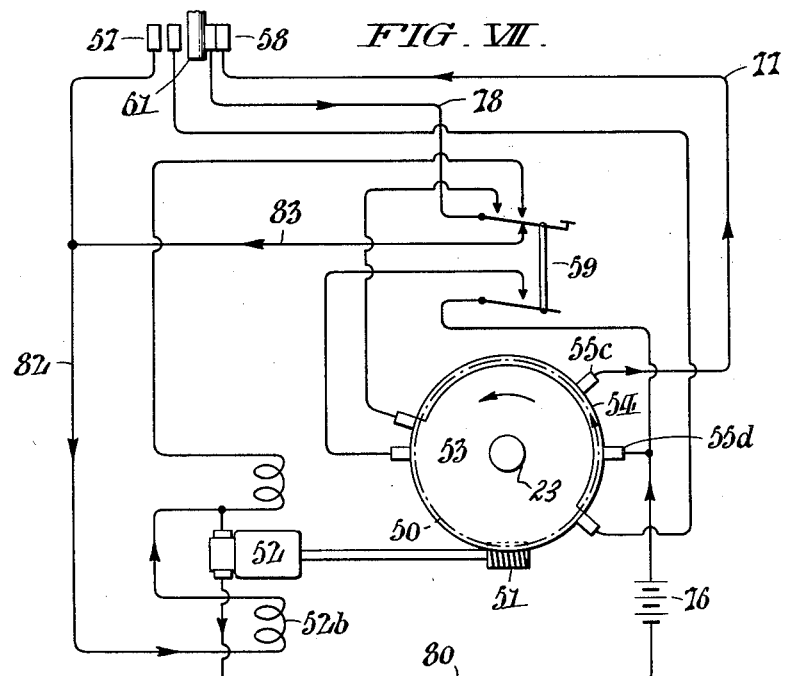
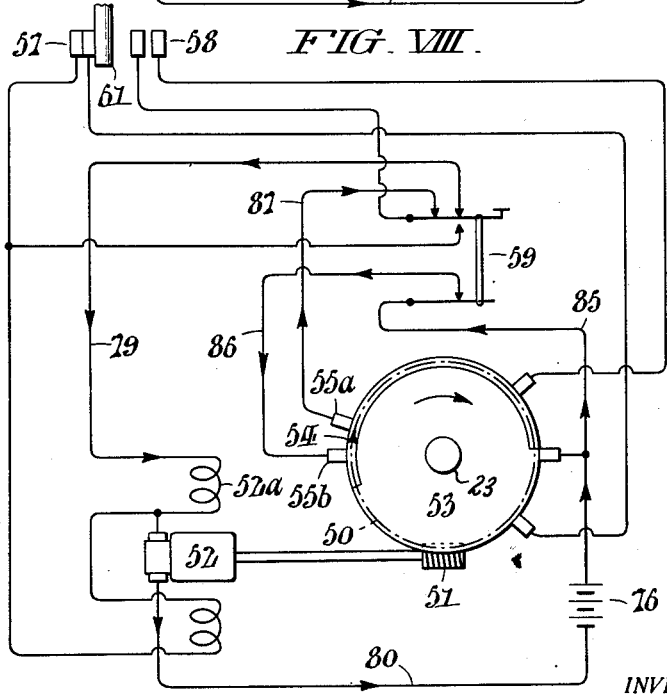

Patented Nov. 30, 1937

2,100,748

UNITED STATES PATENT OFFICE 2,100,748

POWER TRANSMISSION

David C. Prince, Swarthmore, Pa.

Application May 18, 1935, Serial No. 22,132

7 Claims. (Cl. 74—262)

This invention relates to power transmissions of the type including a driving element, a driven element, and mechanism for transmitting power between said elements in different speed ratios. The invention is particularly applicable to automobiles.

The principal object of the invention is to provide a power transmission in which the shifting of gears, or the varying of the speed ratio between the driving and driven shaft, is accomplished automatically and selectively in accordance with the speed of the engine and the power demanded of the engine by the operator, and thus to provide a transmission in which the maximum effort of the engine is applied to the load under all conditions of operation.

A more specific object of the invention is to provide efficient mechanism for selecting the speed ratio to be effected between the driving and driven shafts, and for automatically governing such selection, the mechanism being relatively simple in its construction and reliable in its operation, and of such nature that it may readily be incorporated in an automotive vehicle.

Other objects and advantages which are characteristic of my invention will become more fully apparent from the description hereinafter set forth of one embodiment or example of the invention as applied to a transmission of the planetary gear type, the description having reference to the accompanying drawings, whereof:

Fig. I represents a view, partly in section and partly in side elevation, of a variable speed transmission and cam shafts for controlling its operation.

Fig. II represents a cross section along the line II—II in Fig. I, showing one of the brake drums of the transmission and the mechanism by which it is operated from the cam shafts.

Fig. III represents a perspective view of the speed change cam shaft.

Figs. IV and V represent diagrammatic views, under different conditions of operation, of the electro-mechanical means for actuating the speed change cam shaft, including a view, partly in section of the governor which controls the selective operation of the unit, and the parts associated therewith; and, Figs. VI, VII and VIII represent additional diagrammatic views, similar to Figs. IV and V but omitting the governor, and showing the electric circuits and the manner in which current flows therein under different conditions of operation.

With particular reference to Fig. I of the drawings, there is shown a planetary transmission generally similar to a well-known type. The rear end of the driving shaft of the engine or prime mover is designated at 1. A fly-wheel 2 is affixed to the engine shaft 1, the fly-wheel being adapted to engage a clutch disk 3 mounted on and splined to a propeller shaft extension 4. At its opposite side, the clutch disk 3 is adapted to be engaged by a pressure plate 5 which is urged against it by means of springs 6. The pressure plate 5 is retractible by means of pins 5a connected to the ends of levers 7 which bear upon a clutch throwout collar 8.

The planetary reduction system includes a driven gear 9 keyed to the propeller shaft extension 4, and additional gears 10, 11, 12, mounted respectively on concentric tubular sleeves 13, 14, 15. Meshing with the gear 9 on the propeller shaft extension 4 is a planetary gear 16. Additional planetary gears 17, 18, 19 mesh, respectively, with the gears 10, 11, 12, all of the planetary gears being mounted on a shaft 20 and fixed with respect to one another. The shaft 20 is in turn supported within a housing 21 affixed to the flywheel 2.

The springs 6 tend to cause the disk 5 to engage the clutch 3 and thus to effect a high speed ratio between the engine shaft 1 and the propeller shaft extension 4, the clutch throw-out collar 8 being controlled by a lever 22 engaging a cam 24 on a speed change cam shaft 23. In order to effect speed ratios other than high speed, as well as to reverse the driven shaft 4, the concentric tubes 13, 14, 15 have mounted thereon brake drums designated respectively at 25, 26, 27. When braking pressure is applied to the drum 26, the gear 11 is held against rotation, and through the planetary gears 18, 16 and the gear 9 there is imparted to the driven shaft 4 a forward low speed rotation. When the braking pressure is applied to the drum 25, the gear 10 is held against rotation, and through the planetary gears 17, 16 and the gear 9, there is imparted to the driven shaft 4 a forward intermediate speed rotation. When braking pressure is applied to the drum 27, the gear 12 is held against rotation, and through the planetary gears 19, 16 and the gear 9 there is imparted to the driven shaft 4 a reverse rotation.

Each brake drum 25, 26, 27 has associated therewith a brake band 28 operated by a toggle mechanism or the like, such as comprehensively designated at 30 in Fig. II. The toggle mechanism 30 includes an arm 31 engaged at its ends by a spring 32 and having thereon a pin 33 adapted to engage a cam on the speed change cam shaft 23. The toggle mechanism 30 also includes an additional arm 35 adapted to engage a cam 36 on the shaft 37 which is actuated by the usual clutch pedal. Associated with the brake drums 25, 26, 27 are cams 40, 41, 42, respectively, on the speed change cam shaft 23. The cam 41 operates the brake drum 26 to effect low speed rotation of the driven shaft 4; the cam 40 operates the brake drum 25 to effect intermediate speed rotation of the driven shaft 4; and the cam 42 operates the brake drum 27 to effect reverse rotation of the driven shaft 4. As shown most clearly in Figs. II and III, each cam 40, 41, 42 has a recessed portion 40a, 41a, 42a, and when the pin 33 on the arm 31 of the toggle mechanism 30 engages the recessed portion of the corresponding cam, under the influence of the spring 32, the brake band 28 grips the drum associated therewith to hold the same against rotation. The cams 40, 41, 42 may be rendered inoperative by depressing the clutch pedal which actuates the auxiliary cam shaft 37 through a rod 43 and a clevis 44. When the clutch pedal is depressed, the cams 36 on the shaft 37 occupy the position shown in dot-and-dash lines in Fig. II, engaging the arm 35 of the toggle mechanism 30, and in an obvious manner render the spring 32 ineffective when the pin 33 on the arm 31 registers with the recessed portion of the cam associated therewith. Likewise there is an additional cam 45 on the shaft 37 which renders the high speed cam 24 inoperative. The cam 45 has thereon a boss 46 which is adapted to engage a projection 47 on the lever 22. When such engagement occurs between the boss 46 and the projection 47, the roller 48 at the end of the lever 22 is prevented from entering the notch 49 on the high speed cam 24, and hence the clutch throw-out collar 8 is retained in its neutral position shown in Fig. I.

From the above description it will be apparent that the various speed ratios between the driving shaft 1 and the driven shaft 4 are determined according to the position of the speed change cam shaft 23, but that the clutch pedal when depressed renders the speed change cams 24, 40, 41, 42 inoperative. Rotation of the cam shaft 23 is accomplished by a worm gear 50 driven through a worm 51 by an electric motor 52. On the cam shaft 23 there is also mounted a circuit controller 53 having thereon a segmental contact 54 of conducting material. As shown most clearly in Figs. V to VIII, inclusive, the segmental contact 54 is adapted to engage stationary brushes 55a, 55b, 55c, 55d, 55e. The motor 52 has field windings 52a, 52b, and is reversible, its direction being determined by whether one field or the other is energized. The various circuits leading through the field windings 52a, 52b of the motor 52 and leading to the brushes 55a, 55b, 55c, 55d, 55e are determined according to the position of the segmental contact 54 and the positions of pairs of movable contacts 57, 58. These circuits are also affected by a double-throw manually operated switch 59 which is employed for the purpose of reversing the driven shaft 4.

The electro-mechanical means for selecting the speed ratio to be effected between the driving shaft 1 and the driven shaft 4 are controlled by a governor comprehensively designated at 60 in Figs. IV and V. The governor 60 includes a movable contact making arm 61 adapted to engage the movable contact members 57, 58, and actuated by means of a plunger 62. The plunger 62 is disposed within an oil line 63 in which the flow of oil may be assumed to be caused by the operation of a gear circulating pressure pump driven by the engine shaft 1. Hence the velocity in the oil line 63 is dependent upon the speed of the engine. Oil flows in the line 63 in the direction indicated by the arrows. When the oil is admitted to the chamber 64, the velocity tends to force the plunger 62 to the right, as viewed in Figs. IV and V, this action being resisted by a spring 65, the effect of which may be varied by an adjusting screw 66. A port 85 behind the plunger 62 communicates with the chamber 68 so that there is at all times a uniform resistance offered to movement of the plunger 62. When the plunger 62 moves to the position indicated in Fig. V, the oil is by-passed through a port 67 to the chamber 68. An alternative by-pass from the chamber 64 to the chamber 68 is also provided through an apertured disk 69 which forms a seat for the needle valve 70. The needle valve 70 is urged upwardly by a spring 71 into engagement with a cam 72. Swinging movement of the cam 72 thus determines the degree of opening between the end of the needle valve 70 and the apertured disk 69. The cam 72 is connected by a link 73 with a throttle valve 74, which in turn may be connected to an accelerator rod 75 operated by the usual accelerator pedal. When the throttle valve 73 is in a substantially closed position as indicated in Fig. IV, the needle valve 70 is nearly closed, permitting only a small portion of the oil to flow through the apertured disk 69 into the chamber 68. As the throttle valve 74 opens, the needle valve rises, allowing more oil to be by-passed to the chamber 68.

It will thus be apparent that the plunger 62 and its contact making arm 61 may occupy any one of three different positions depending upon the speed of the engine shaft 1 and the degree of opening of the throttle valve 74. When the engine is idling and the throttle valve is substantially closed, pressure in the chamber 64 is insufficient to move the plunger 62 to the right. It, therefore, under this condition, occupies the position represented in Fig. IV, closing the movable contacts 57. When the throttle valve 74 is partially opened, and the engine is running at a greater speed, the velocity in the chamber 64 increases, and the plunger 62 moves to the right. Under certain conditions, with increased velocity in the chamber 64, the plunger 62 may float with the contact making arm 61 occupying a position midway between the movable contacts 57 and the movable contacts 58. Under other conditions, when the velocity in the chamber 64 is further increased, the plunger 62 will be moved to its extreme position to the right, as indicated in Fig. V, closing the movable contacts 58, the oil being by-passed from the chamber 64 to the chamber 68 through the port 67. The apertured disk 69 is relatively thin so as to reduce the effects of temperature and viscosity in altering the flow of oil through the needle valve. By properly proportioning the needle valve aperture and adjusting the spring 65, the plunger 62 may be moved to the right when the engine exceeds its speed for maximum horse power at full throttle, and to move to the left when the speed falls below that which corresponds to maximum horse power on the next lower gear ratio. For low throttle openings the passage through the apertured disk 69 will be reduced so that the plunger 62 will move to the right at engine speeds only slightly greater than idling.

A typical operation of the above described apparatus is as follows. The normal position of the parts of the transmission is represented in Fig. I. Assuming that the engine is started at idling speed with a very small throttle opening, the parts occupy the position represented in Fig. IV. The plunger 62 maintains the movable contacts 57 in engagement. The segmental contact 54 is in engagement with the brushes 55c, 55d only. The motor 52 is at rest. The brake bands 28 are out of engagement with the brake drums 25, 26, 27, and the clutch throw-out collar 8 is in the position represented in Fig. I in which the clutch disk 3 is not engaged by the pressure plate 5. The operator, desiring to effect a forward motion of the vehicle, depresses the accelerator pedal, opening the throttle valve 74. Increased speed of the engine causes a corresponding increase in oil velocity in the chamber 64, and the plunger 62 is urged to the right, closing the movable contacts 58. The exciting current for the motor 52 is then free to flow from the battery 76 to brush 55d through the segmental contact 54, the brush 55c, conductor 77, movable contacts 58, conductor 78, the switch 59, conductor 79, thence through the field winding 52a to the armature of the motor 52, and through the conductor 80 to the negative side of battery 76. This causes a forward rotation of the motor 52, which in turn causes a clockwise rotation of the segmental contact 54 as indicated in Fig. V.

Rotation of the cam shaft 23 through the action of the cam 41 applies a braking pressure on the drum 26, and causes power to be transmitted from the driving shaft 1 to the driven shaft 4 at a low speed ratio. As soon as the lower speed ratio is effected, the slowing down of the engine will cause a momentary decrease in the oil velocity in the chamber 64, which in turn will cause the contact making arm 61 to float between the movable contacts 57, 58, breaking the circuit to the motor 52. If the throttle valve 74 is further opened so as to cause the engine speed to rise again, the movable contacts 58 will again be closed, causing a further operation of the motor 52 and a continued clockwise rotation of the segmental contact 54. Continued rotation of the cam shaft 23 causes the cam 40 to take effect and pressure to be applied at the brake drum 25, thus effecting an intermediate speed ratio between the driving shaft 1 and driven shaft 4. With continued throttle opening the high speed cam 24 will eventually cause a swinging movement of the lever 22, which in turn will permit the clutch throw-out collar 8 to move to the right, permitting the disk 5 under the influence of the spring 6 to engage the clutch 3.

At this point the segmental contact 54 interrupts the circuit to the motor 52 by its passage away from contact with the brush 55c. Assuming that the vehicle is in high gear, and that it approaches a steep incline which causes the motor speed to be reduced, the plunger 62 will move to the left, urged by the spring 65, until the contact members 57 are closed, and the parts occupy the position represented in Fig. VI. Current accordingly flows from battery 76 to the brush 55d, thence through the segmental contact 54, brush 55e, conductor 81, movable contacts 57, conductor 82, and the field winding 52b to the armature of the motor 52, and thence through conductor 80 to the negative side of battery 76. When the field winding 52b is thus excited, the direction of rotation of the motor 52 is reversed, causing the cam 40 to operate to effect an intermediate speed ratio between the driving shaft 1 and the driven shaft 4. This will permit the engine to increase its speed and tend to move the plunger 62 again to the right, opening the movable contacts 57. If, however, the grade is such that the engine again slows down, this operation will be repeated, and low gear transmission will eventually be effected.

In the event that it is desired to reverse the transmission, the switch 59 is moved to the position indicated in Fig. VII. Under these conditions, assuming that the movable contacts 58 are closed, current flows from the battery 76 to the brush 55d, and then through the segmental contact 54, brush 55c, conductor 77, movable contacts 58, conductor 78, to the switch 59, and thence through conductor 83, conductor 82, field winding 52b, to the armature of the motor 52, and through conductor 80 to the negative side of the battery 76. Counter-clockwise rotation of the cam shaft 23 causes the cam 42 to apply braking pressure on the brake drum 27, reversing the direction of rotation of the driven shaft 4.

When the operator desires to return from reverse to forward movement, and the switch 59 is returned to its normal position, the parts will occupy the positions reprsented in Fig. VIII. Current will flow from the battery 76, through conductor 85, the switch 59, conductor 86, the brush 55b, the segmental contact 54, brush 55a, conductor 87, the switch 59, conductor 79, the field winding 52a, to the armature of the motor 52, returning to battery 76 by conductor 80.

It will be apparent from the above description that with the apparatus of this invention, the selection of the theoretically correct gear ratio is accomplished entirely automatically, with the exception of the reversal of the driven shaft which is accomplished manually by the movement of a switch. The action of the governor is such that selected gear ratio will conform to the demands upon the vehicle and be responsive to the combined factors of engine speed and the degree of throttle opening. The reference herein to a "throttle" or "throttle opening" is intended to include any equivalent device for regulating a prime mover.

While I have described in some detail one particular example of apparatus embodying my invention, and its mode of operation, it will be apparent that many changes may be made in the form of the mechanical and electrical instrumentalities herein described and illustrated, and that certain features of the invention may at times be used to advantage without a corresponding use of other features, all without departing from the spirit of the invention as defined in the annexed claims.

Having thus described my invention, I claim:

1. In combination with a prime mover having a driving shaft, a throttle for controlling said prime mover, a driven shaft, and means for transmitting power from said driving shaft to said driven shaft in different speed ratios; means for selecting the speed ratio to be effected between said shafts; and a circulating fluid means including a piston directly in the fluid stream for automatically controlling such selection including a contact making device operated by the pressure effect of a fluid velocity, the velocity and pressure effect varying in accordance with the speed of one of said shafts as modified by a linkage with said throttle governed by the degree of throttle opening, which directly modifies the effective pressure of the flow of fluid.

2. In combination with a prime mover having a driving shaft, a throttle for controlling said prime mover, a driven shaft, a circulating pump operated by one of said shafts, and means for transmitting power from said driving shaft to said driven shaft in different speed ratios; electro-mechanical means for selecting the speed ratio to be effected between said shafts; and means for automatically controlling such selection including a contact making device operated by the pressure effect of a fluid velocity from the pump aforesaid; and means connected to said throttle for varying the effective velocity and pressure effect for operation of the contact making device in accordance with the degree of throttle opening, which directly modifies the effective pressure of the flow of fluid.

3. In combination with a prime mover having a driving shaft, a throttle for controlling said prime mover, a driven shaft, means for transmitting power from said driving shaft to said driven shaft in different speed ratios, and an oil distributing system wherein the velocity is controlled by the speed of said prime mover; electro-mechanical means for selecting the speed ratio to be effected between said shafts; and means for automatically controlling such selection including a contact making device having its movement governed primarily by the pressure effect of the velocity of flow in said oil distributing system and secondarily by a linkage with said throttle governed by the degree of throttle opening, which directly modifies the effective pressure of the flow of oil.

4. In combination with a prime mover having a driving shaft, a throttle for controlling said prime mover, a driven shaft, and means for transmitting power from said driving shaft to said driven shaft in different speed ratios; electro-mechanical means for selecting the speed ratio to be effected between said shafts; a contact making device for automatically controlling such selection, the movement of said device being governed primarily by fluid pressure varying in accordance with the speed of the driving shaft; and a needle valve for modifying said fluid pressure, said needle valve being actuated by the throttle aforesaid.

5. In combination with a prime mover having a driving shaft, a throttle for controlling said prime mover, a driven shaft, and means for transmitting power from said driving shaft to said driven shaft in different speed ratios; electro-mechanical means for selecting the speed ratio to be effected between said shafts; a selective contact-making device; a fluid circulating pump operated by said prime mover; and a fluid governor connected to said pump for automatically controlling the selection of said contact-making device in accordance with the speed of said prime mover, said fluid governor having a spring urged control plunger, a by-pass progressively operable as the pressure and velocity of the fluid discharge from said pump overcomes said spring, an equalizing port admitting fluid pressure back of said plunger, and a second by-pass controlled by a needle valve actuated by said throttle aforesaid to open as the throttle is opened.

6. The device according to claim 5 characterized by the further fact that said needle valve comprises a tapered plunger operating in an aperture of a relatively thin disk whereby the effects of temperature and viscosity on the flow of fluid through the valve are reduced.

7. In combination with a prime mover having a driving shaft, a throttle for controlling said prime mover, a driven shaft, and means for transmitting power from said driving shaft to said driven shaft in different speed ratios; electro-mechanical means for selecting the speed ratio to be effected between said shafts; a contact making device for automatically controlling such selection, the movement of said device being governed primarily by fluid pressure varying in accordance with the speed of the driven shaft; and a needle valve for modifying said fluid pressure, said needle valve being actuated by the throttle aforesaid.

DAVID C. PRINCE.